United States Patent [19]

Danø

[11] 4,101,337

[45] Jul. 18, 1978

[54] CEMENT MANUFACTURE

[75] Inventor: Tage Halfdan Danø, Copenhagen Valby, Denmark

[73] Assignee: F. L. Smidth & Co., Cresskill, N.J.

[21] Appl. No.: 828,192

[22] Filed: Aug. 26, 1977

Related U.S. Application Data

[62] Division of Ser. No. 618,819, Oct. 2, 1975, Pat. No. 4,059,396.

[30] Foreign Application Priority Data

Oct. 3, 1974 [GB] United Kingdom ............... 42989/74

[51] Int. Cl.² .............................................. C04B 7/50
[52] U.S. Cl. ..................................... 106/101; 106/102
[58] Field of Search ................................ 106/101, 102

[56] References Cited

U.S. PATENT DOCUMENTS

| 2,015,866 | 10/1935 | Nielsen | 106/102 |
|---|---|---|---|
| 3,074,705 | 1/1963 | Dano et al. | 106/102 |
| 3,692,286 | 9/1972 | Borreill | 106/102 |

Primary Examiner—J. Poer

Attorney, Agent, or Firm—Pennie & Edmonds

[57] ABSTRACT

A method is disclosed for manufacturing white cement wherein cement clinker is burnt in a kiln and prior to discharge from the kiln the clinker is contacted with a reducing agent such as fuel oil. The method further comprises discharging the hot cement clinker from the discharge portion of the kiln to a movable clinker supporting means such as a rotatable conveyor and quenching the cement clinker simultaneously with the discharge thereof from the kiln by subjecting the clinker to a spray of cooling water in a manner such that a major portion of the quenching water evaporates substantially immediately following the quenching. The method further comprises transferring the cement clinker to a clinker transporting means such as a linear conveyor and subjecting the clinker to further cooling while evaporating substantially all of the remaining quenching water, and creating and maintaining a sub-atmospheric pressure at the location of discharge of the hot cement clinker from the kiln to prevent evaporating water from entering the kiln. The invention also pertains to plant for practicing the inventive method.

31 Claims, 9 Drawing Figures

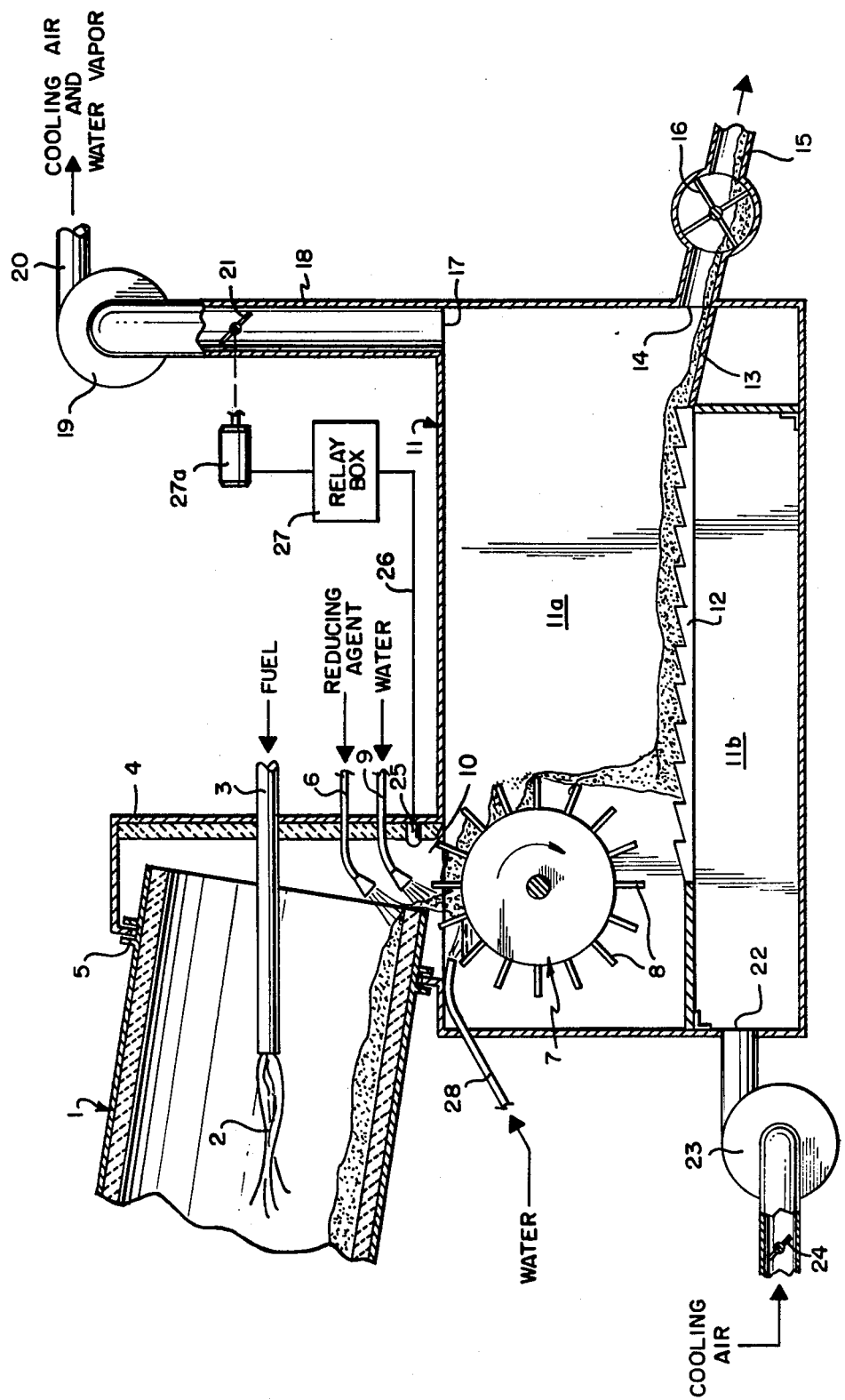

CEMENT MANUFACTURE

This is a division of application Ser. No. 618,819 filed Oct. 2, 1975 now U.S. Pat. No. 4,059,396, dated Nov. 22, 1977.

BACKGROUND OF THE INVENTION

1. Field of the Invention

This invention relates to a method of subjecting cement clinker burned in a rotary kiln to a reduction, by spraying the clinker with a reducing agent, and subsequently cooling it. The invention also relates to a plant for practicing the improved method.

2. Description of the Prior Art

A known method for producing white cement consists in effecting the reduction of the cement clinker inside the kiln. The reducing agent is added to the clinker at a high temperature, and water is sprayed on the clinker by means of nozzles immediately afterwards so as to effect a quenching. This method not only produces the well known effect on the whiteness of the cement due to quenching, but also prevents oxidation by ensuring that no air is admitted during the addition of the reducing agent to the clinker so that reoxidation is prevented.

This method has been found to produce a very favourable whiteness of cement in practice. Furthermore, the method has the advantage that the clinker is perfectly dry when leaving the kiln system, making extra drying unnecessary.

However, a drawback of the method is that a proportion of the water vapours generated by the water cooling enter the kiln together with the smoke from the combustion, even when means are provided for removing a maximum amount of water vapour by suction. This inevitable amount of water vapour results in an increased heat consumption in the burning step and thus a lower production of the rotary kiln than that which would be attained without the presence of the water vapour.

Commonly assigned U.S. Pat. No. 3,074,075 to Danø et al relates to such a treatment where material traveling through a rotary kiln is reduced in the kiln by directing a conical spray of a reducing agent upon an area of the inclined surface of the moving burned material with the axis of the spray normal to the inclined surface. The reduced material is cooled by directing a conical spray of cooling agent upon a closely adjacent area of the inclined surface of the material, with the axis of the spray normal to the inclined surface. The material burned is a raw material suitable for the production of white cement.

It is also known to effect water cooling of the clinker outside the rotary kiln. Usually, this step is performed by causing the clinker when discharged from the kiln to fall into a water bath from which it is rapidly removed, for example, by means of a drag chain. This method, although ensuring that the water vapour is prevented from entering the kiln, has two essential drawbacks. First, the whiteness obtained in practice is inferior to the whiteness obtained by the former method, and secondly, the clinker has a water content of 10–12% after the process. This requires a supplementary drying, i.e., a supply of extra heat. The water content also reduces the strength of the cement manufactured from such clinker because a certain amount of hydration is inevitable. I have invented a method and plant for producing cement in which the disadvantages of the prior art are avoided, and the advantages are successfully and usefully combined to produce an improved product.

SUMMARY OF THE INVENTION

The invention relates to a method of manufacturing cement comprising burning cement clinker in a kiln, contacting the hot cement clinker with a reducing agent prior to discharging the clinker from a discharge portion of the kiln. For an inclined rotary kiln the discharge portion is located at the lower end of the kiln. The method further comprises discharging the hot cement clinker from the discharge portion of the kiln to a movable clinker supporting means and quenching the cement clinker simultaneously with the discharge thereof from the kiln by subjecting the clinker to a spray of cooling liquid such as cooling water, in a manner such that a major portion of the quenching liquid evaporates substantially immediately following the quenching. The method further comprises transferring the cement clinker to a clinker transporting means such as a moving pneumatic conveyor, and subjecting the cement clinker to further cooling while evaporating sustantially all of the remaining cooling water, and creating and maintaining sub-atmospheric pressure at the location of discharge of the hot cement clinker from the kiln to prevent evaporating water from entering the kiln.

Advantageous features of the invention which particularly distinguish over the known methods pertain to the quenching of the clinker being carried through outside the kiln, the discharged clinker being sprayed with water to such an extent and under conditions that the ready cooled clinker will be completely dry. At the same time water vapours are prevented from reaching the kiln.

While the quenching is effected by the evaporation of the water sprayed onto the clinker, only about 85–90% of the water evaporates at this stage, the remaining amount of water being reserved for the treatment to which the clinker is subjected on the lower conveyor. The shock cooling or quenching will not reach as far as the core of the individual clinker pieces, particularly the larger ones and for this reason the initial cooling or quenching is succeeded by a supplementary cooling which takes place on the lower conveyor. During this supplemental treatment the remaining part of the water is evaporated so as to cool the clinker further. At the same time a temperature equalization takes place with the result that upon completion of this treatment the clinker will be completely dry, having throughout attained the desired low final temperature.

As the quenching of the clinker is initiated immediately after leaving the kiln, and as the reduction of the clinker should take place before the quenching, it is preferable to spray the reducing agent on to the clinker inside the kiln directly before the clinker leaves the kiln. A preferred reducing agent is fuel oil having a viscosity of 15° Engler (approximately 110 centistokes). The reducing agent may be atomized in a special unit by means of steam or air when being sprayed on the clinker.

During the finishing cooling and temperature equalization the clinker is preferably distributed in a layer and advanced on the lower advancing support which is air-permeable. Cooling air is blown or drawn through the support and the layer of clinker as a traverse current coming from the underside of the support. Thus not only the evaporation of the remaining water but also the airflow passing through the clinker layer, contribute to the cooling and the temperature equalization of the clinker. In addition the air-flow takes with it the water vapour, so that the clinker on reaching the discharge end of the lower advancing support, is completely dry and cooled down.

Preferably the amount of cooling water is 30–40% by weight that of the clinker. The method makes it possible to achieve the desired quenching of the clinker thereby avoiding using such large amounts of water that the clinker is moistened. Thus hydration — which diminishes the strength of the cement clinker — is avoided.

It is also advantageous if both the amount of water sprayed onto the clinker per unit time and the speed at which the clinker is conveyed by the two conveyors are selectively variable. When the advancement of the upper conveyor is controlled in a manner such that the clinker is retained in the water spray, for example, from 2 - 20 seconds, and the advancement of the lower advancing support is much slower, such as, say 2 - 5 minutes, or more. Under such conditions it has been found that satisfactory cooling conditions are obtained.

Division of the stream of clinker discharged from the kiln is advantageous because the division into small separate portions promotes an intense quenching of the clinker. Preferably water is also sprayed onto the upper conveyor at a point just before it receives the hot clinker in such a manner that the clinker falls into this water. The amount of water such added will contribute to the quenching of the clinker, and prevents damage to the support by the hot clinker when it falls onto the upper conveyor.

A plant is disclosed for producing cement which comprises a kiln for burning cement clinker, means to contact the cement clinker with a reducing agent prior to discharge from the kiln, first means to movably support the cement clinker discharged from the kiln, with means to spray cooling liquid such as water on the clinker while it is discharged on to the support means. The invention further comprises second clinker supporting means to support clinker transferred from the first support means and for further cooling the clinker and means to produce sub-atmospheric pressure at the location of discharge of the hot cement clinker from the kiln to prevent water evaporating from the cement clinker from entering the kiln. Preferably the clinker used is of the type intended for manufacturing white cement. Raw material of the desired type is sintered in a rotary kiln and thereafter treated according to the invention.

Preferably, the first support means is an upper conveyor consisting of a cylindrical drum rotatable about a horizontal axis, and having its surface formed with cells which are arranged to catch portions of the clinker falling from the kiln, the walls and bottom of the cells consisting of or being lined with a refractory material.

The kiln is preferably a rotary kiln having one or more stationary pipes arranged so as to spray the clinker with a reducing agent inside the kiln immediately before discharge. The kiln outlet is provided with one or more spray pipes to cool the clinker simultaneously with conveying it and the lower conveyor is air penetrable and positioned substantially horizontally beneath the upper advancing support, to receive the partially cooled clinker and convey it in a layer to a discharge point, means being provided for passing the air transversely through the lower conveyor and the layer of clinker thereon.

The casing surrounding the upper and lower conveyors may be divided into upper and lower parts by the lower conveyor. An opening for the supply of cooling air is provided in the lower part of the casing. Openings for admission of hot clinker and for discharge of cooled clinker, as well as the opening for discharge of spent cooling air, are provided in the upper part of the casing. The opening for the discharge of spent cooling air is positioned in communicating relationship with the suction side of a fan for drawing the cooling air through the lower conveyor, and means being provided for automatically creating and maintaining a reduced pressure in the casing to prevent the passage of water vapours through the opening into the kiln.

Further control of the cooling process may be obtained when the opening for admission of cooling air provided in the lower part of the casing is equipped with a fan, having means for regulating its speed.

BRIEF DESCRIPTION OF THE DRAWINGS

A preferred embodiment of the invention is described hereinbelow with reference to the sole drawing which illustrates a vertical longitudinal section of the outlet portion of a plant for treating cement clinker according to the invention.

DETAILED DESCRIPTION OF THE PREFERRED EMBODIMENT

The drawing represents the discharge portion of the lower end 1. of a rotary kiln to be used in the manufacture of white cement according to the invention. A charge of burned clinker is indicated at the lower portion of the kiln, and the clinker falls as a stream down from the outlet end of the kiln. The burning in the kiln is effected by the heat developed in a flame 2 formed at the end of a burner pipe 3 extending into the kiln from a casing 4 surrounding the discharge portion of the kiln. A seal 5 of a conventional kind tightens the casing 4 against the kiln wall.

A spray pipe 6 for spraying the clinker with reducing agent, preferably fuel oil, extends from the casing 4 towards the kiln mouth, with its end turned so as to point just at the clinker which is about to leave the kiln. As a result of this arrangement the clinker is reduced before falling onto a rotating cell drum 7 positioned below the kiln outlet and rotated by means (not shown) in the direction indicated by the arrow. The cell drum consists of a hollow metallic drum which has radial fins 8 on its circumference which, together with circular plates provided at the ends of the drum, create compartments at the surface of the drum. The clinker falling from the kiln is caught in the compartments and divided up into portions which are advanced away from the kiln end due to a slow rotation of the drum. Simultaneously the clinker is sprayed with cooling water through a spray pipe 9 passing through the casing 4 and having its mouth positioned, so as to be able to spray both the falling clinker stream falling from the kiln and the cells of the cell drum.

As a result of the simultaneous spraying the clinker is quenched, and 85-90% of the water evaporates substantially immediately, the time period being usually between 2 and 20 seconds, according to the circumstances. The passage of the clinker from the casing 4 and to the cell drum 7 takes place through an opening 10 provided in a casing 11 surrounding the cell drum 7. The casing 11 also houses a lower pneumatic conveyor 12 which divides the casing 11 into an upper and a lower part, 11a and 11b. The lower advancing support may be any conventional horizontal air-penetrable conveyor capable of facilitating material transfer at a regulatable speed. A layer of clinker is formed by the clinker portions falling freely from the cell drum 7 as shown in the drawing on to the adjacent end of the lower conveyor. The clinker layer is subsequently pushed onto a sloping guide surface 13 along which it slides out of the casing 11 through an opening 14 provided for that purpose. The cooled clinker flows out into a sloping pipe 15 provided with a sluice 16 of known kind which prevents atmospheric air from being sucked into the casing.

Another opening, 17, is also provided in the casing 11 and communicates with a pipe 18 leading to the suction side of a fan 19, the pressure side of which is connected to a pipe 20 provided to lead away the spent cooling air and the water vapor contained therein. In the pipe 18 a damper 21 is provided to control the draught of spent cooling air passing up through the pipe 18. The air removed from the casing 11 under the influence of the draught passing through pipe 18 is replaced by fresh air entering into the casing 11 through an opening 22 which is provided in the casing below the lower advancing conveyor 12 which is represented diagrammatically. The opening 22 may allow a direct passage of atmospheric air therethrough under the influence of the draught created by the fan 19. However, due to the pressure drop caused by the passage of the cooling air through the lower advancing conveyor 12 it is advantageous to force the cooling air through the opening 22. This is accomplished by connecting the pressure side of a fan 23 to the opening 22. At the suction side of this fan a damper 24 is provided to regulate the capacity of the fan.

The flow of cooling air passed through the clinker layer, sprayed out on to and advanced by the lower advancing support 12, contributes together with the evaporation of the amount of water still present in the layer to the final cooling and temperature equalization of the clinker. The clinker on reaching the discharge end of the lower support is completely dry, and at a temperature of approximately 100° C.

A pressure sensor 25 is provided near the opening 10 in the casing 11. It is designed to give electrical signals when the sub-atmospheric pressure near the opening 10 in the casing 11 passes below a given minimum or above a given maximum value. These signals are transmitted through electrical conduits 26 to a relay box 27 and then to a pilot motor 27a which controls the position of the damper 21 in the pipe 18. This arrangement ensures that the sub-atmospheric pressure in the opening 10 is kept constantly at such a value that no air passes from the casing 11 through the opening 10 into the casing 4 thus preventing water vapor from passing into the kiln. However, a negligible flow of air (false air) passes in the opposite direction because the pressure in the casing 11 is lower than the pressure in the casing 4. This facilitates the evacuation of all the water vapor present in the casing 11 through the pipe 18 by means of the fan 19.

The sub-atmospheric pressure in the casing 11 may for example be 2 mm. water gauge (w.g.). If the pressure sinks below that value the damper 21 is closed until the pressure decrease is halted and the desired pressure restored. If the pressure rises above the given value the damper is opened, until the desired pressure is restored.

In the upper left hand corner of the casing 11 a pipe 28 is shown. This pipe pours an amount of water into every compartment of the cell drum 7, immediately before the compartment in question is rotated into the position in which it receives the clinker. The compartment is simultaneously subjected to waterspray from the spray pipe 9.

The purpose of this additional water is to cool somewhat the compartment which, at this position is still hot. Further, in this manner the cell drum and a refractory lining of the drum and the cells may be protected from damage by the hot clinker in that a sudden rise in temperature upon addition of hot clinker is prevented.

I claim:
1. A method of manufacturing cement comprising:
   (a) burning cement clinker in a kiln;
   (b) contacting the hot cement clinker with a reducing agent prior to discharging said clinker from a discharge portion of the kiln;
   (c) discharging the hot cement clinker from the discharge portion of the kiln to a movable clinker supporting means;
   (d) quenching said cement clinker substantially simultaneously with the discharge thereof from the kiln by subjecting said clinker to a spray of cooling liquid in a manner such that a major portion of said quenching liquid evaporates substantially immediately following said quenching;
   (e) transferring said cement clinker to a clinker transporting means;
   (f) subjecting said cement clinker to further cooling while evaporating substantially all of the remaining cooling liquid; and
   (g) producing and maintaining sub-atmospheric pressure at the location of discharge of the hot cement clinker from the kiln to thereby prevent evaporating liquid from entering the kiln.

2. The method according to claim 1 further comprising spraying the reducing agent onto the cement clinker substantially immediately prior to its discharge from the kiln and cooling said clinker with cooling water.

3. The method according to claim 2 further comprising atomizing the spray of reducing agent on said cement clinker while in said kiln.

4. The method according to claim 1 further comprising regulating the flow of quenching water in a manner such that the amount of quenching water is approximately 30–40% by weight that of the clinker to be cooled.

5. The method according to claim 2 further comprising regulating the flow of quenching water in a manner such that the amount of quenching water is approximately 30–40% by weight that of the clinker to be cooled.

6. The method according to claim 1 further comprising directing said cement clinker from said kiln to a first conveying means and then to a second conveying means and selectively varying the amounts of water per unit of time sprayed onto the cement clinker.

7. The method according to claim 6 further comprising selectively varying the speed of the first and second conveying means.

8. The method according to claim 1 further comprising selectively varying in dependent relationship, the amount of water sprayed onto the clinker to be cooled per unit of time and the speed at which said first and second conveyors carry the clinker.

9. The method according to claim 4 further comprising selectively varying in dependent relationship, the amount of water sprayed onto the clinker to be cooled per unit of time and the speed at which said first and second conveyors carry the clinker.

10. The method according to claim 6 further comprising automatically varying in dependent relationship the speed at which the clinker exiting the kiln is transported on said upper and lower conveyors and the amount of water sprayed on said clinker per unit of time in such manner that the clinker is substantially completely dry and at a temperature of approximately 100° C upon leaving the lower conveyor.

11. The method according to claim 1 further comprising dividing into discrete portions the clinker discharged from the kiln onto the clinker supporting means.

12. The method according to claim 4 further comprising dividing into discrete portions the clinker discharged from the kiln onto the clinker supporting means.

13. The method according to claim 5 further comprising dividing into discrete portions the clinker discharged from the kiln onto the clinker supporting means.

14. The method according to claim 8 further comprising dividing into discrete portions the clinker discharged from the kiln onto the clinker supporting means.

15. The method according to claim 9 further comprising spraying water onto the upper conveyor at a location where the hot clinker is received from the kiln prior to receipt of said clinker.

16. The method according to claim 1 wherein said first mentioned clinker supporting means is a clinker conveyor and the clinker transporting means is an air permeable lower clinker conveyor, the method further comprising passing cooling air through the lower conveyor and the clinker located on said conveyor.

17. The method according to claim 2 wherein said first mentioned clinker supporting means is a clinker conveyor and the clinker transporting means is an air permeable lower clinker conveyor, the method further comprising passing cooling air through the lower conveyor and the clinker located on said conveyor.

18. The method according to claim 6 further comprising quenching the cement clinker exiting from the kiln to a first casing surrounding the discharge portion of the kiln in air-tight sealed relationship therewith.

19. The method according to claim 16 further comprising quenching the cement clinker exiting from the kiln to a second casing substantially enclosing the first and second conveying means, the second casing having at least one inlet means and at least one outlet means and the inlet means being in sealed communicating relationship with the first casing.

20. The method according to claim 17 further comprising creating sub-atmospheric pressure at the location of discharge of the hot cement clinker from the kiln.

21. The method according to claim 18 further comprising directing cooling air to the second casing.

22. The method according to claim 19 further comprising regulating the amount of cooling air directed to the second casing.

23. The method according to claim 20 further comprising directing cement clinker exiting the kiln onto a first rotating conveyor and thereafter directing the cement clinker onto an air permeable lower conveyor.

24. The method according to claim 21 further comprising forcing the cooling air through the air permeable lower conveyor.

25. The method according to claim 1 further comprising sensing the air pressure within the first casing at a location adjacent the discharge portion of the kiln.

26. The method according to claim 22 further comprising directing cement clinker exiting the kiln onto a first rotating conveyor and thereafter directing the cement clinker onto an air permeable lower conveyor.

27. The method according to claim 22 further comprising dampening the rate of discharge of the heated cooling air exiting from the second casing and controlling the dampening rate in relation to atmospheric pressure changes at the point of discharge of hot clinker from the kiln so as to compensate for said changes.

28. The method according to claim 23 further comprising discharging the substantially completely cooled and dried cement clinker from the second casing in a manner such that sub-atmospheric pressure is maintained at the point of discharge of hot cement clinker from the kiln.

29. A method of manufacturing cement comprising:
(a) burning cement raw material in an inclined rotary kiln to produce cement clinker;
(b) spraying the hot cement clinker with a reducing agent prior to discharge of said clinker from the discharge end of the kiln;
(c) discharging the hot cement clinker from the discharge end of the kiln onto a first rotatable upper conveyor in discrete portions;
(d) quenching each discrete portion of said clinker successively simultaneously with the discharge thereof from the kiln by subjecting said clinker to a spray of cooling water and permitting evaporation of said cooling water substantially immediately following said quenching;
(e) transferring said cement clinker to a second lower conveyor;
(f) subjecting said cement clinker to a final cooling while causing substantially all of the quenching water to be evaporated;
(g) reducing the pressure at the discharge portion of the rotary kiln to levels less than atmospheric pressure so as to prevent water evaporating from said clinker from entering the kiln; and
(h) maintaining said sub-atmospheric pressure at the location of discharge of the hot cement clinker from the kiln.

30. A method of manufacturing white cement comprising:
(a) burning cement raw material in a rotary kiln to produce cement clinker;
(b) spraying the hot cement clinker with a reducing agent such as fuel oil prior to discharge of said clinker from the outlet end portion of the kiln;
(c) discharging the cement clinker from the outlet end portion of the kiln into a first casing which surrounds the outlet end portion of the kiln in sealed relationship therewith;
(d) directing said discharged hot cement clinker onto a first upper rotatable conveyor in a manner which divides the clinker into separate and discrete sub-portions;
(e) quenching each discrete portion of said clinker successively and substantially simultaneously with the discharge thereof from the kiln outlet end portion by subjecting said clinker to a spray of cooling water;

(f) permitting substantially immediate evaporation of approximately 85–90% of the cooling water;

(g) regulating the total amount of cooling water to approximately 30–40% by weight of the clinker to be cooled;

(h) transferring said cement clinker from said first upper rotatable conveyor to a second air permeable conveyor positioned below the first conveyor and advancing linearly in a direction away from the kiln outlet end portion to transport the cement clinker therefrom;

(i) subjecting said cement clinker to a final cooling while causing substantially all of the remaining quenching water to be evaporated therefrom;

(j) reducing the pressure at the discharge location of the rotary kiln to a sub-atmospheric level so as to prevent water evaporating from the clinker from entering the kiln; and (k) maintaining the sub-atmospheric pressure at the location of the discharge of the hot cement clinker from the kiln while forcing cooling air through said lower conveyor and through said cement clinker to cool the cement clinker thereon.

31. A method of manufacturing white cement comprising:

(a) burning cement raw material in a rotary kiln to produce cement clinker;

(b) spraying the hot cement clinker with a reducing agent such as fuel oil having a viscosity of approximately 15° E. prior to discharge of said clinker from the outlet end portion of the kiln;

(c) discharging the cement clinker from the outlet end portion of the kiln into a first casing which surrounds the outlet end portion of the kiln in sealed relationship therewith;

(d) pouring a predetermined amount of cooling liquid into sub-compartments of a first upper rotatable conveyor;

(e) directing said discharged hot cement clinker into said sub-compartments of said first upper rotatable conveyor in a manner which divides the clinker into discrete sub-portions;

(f) quenching each discrete portion of said clinker successively and substantially simultaneously with the discharge thereof from the kiln outlet end portion by subjecting said clinker to a spray of cooling liquid;

(g) permitting substantially immediate evaporation of approximately 85–90% of the cooling liquid;

(h) regulating the total amount of cooling liquid to approximately 30–40% by weight of the clinker to be cooled;

(i) transferring said cement clinker from said first upper rotatable conveyor to a second air permeable conveyor positioned below the first conveyor and advancing linearly in a direction away from the kiln outlet end portion to transport the cement clinker therefrom;

(j) subjecting said cement clinker to a final cooling while causing substantially all of the remaining quenching liquid to be evaporated therefrom;

(k) reducing the pressure at the discharge location of the rotary kiln to a sub-atmospheric level so as to prevent liquid evaporating from the clinker from entering the kiln; and (1) maintaining the sub-atmospheric pressure at the location of the discharge of the hot cement clinker from the kiln while forcing cooling air through said lower conveyor and through said cement clinker to cool the cement clinker thereon.

* * * * *